(12) United States Patent
Wang

(10) Patent No.: US 6,328,057 B1
(45) Date of Patent: Dec. 11, 2001

(54) AIR VALVE CONNECTION HEAD OF HAND-HELD AIR PUMP

(76) Inventor: Lo-Pin Wang, 16F-2, No. 17, Lane 52, Sec. 3, Re He Rd., Taichung (TW)

( * ) Notice: Subject to any disclaimer, the term of this patent is extended or adjusted under 35 U.S.C. 154(b) by 0 days.

(21) Appl. No.: 09/557,407

(22) Filed: Apr. 24, 2000

(51) Int. Cl.[7] ............................................. F16K 15/20
(52) U.S. Cl. ........................... 137/231; 137/223; 417/511
(58) Field of Search ................................. 137/223, 231; 417/511

(56) References Cited

U.S. PATENT DOCUMENTS

| 5,165,876 | 11/1992 | Wang . | |
|---|---|---|---|
| 5,749,392 | * 5/1998 | Glotin | 137/231 |
| 5,762,095 | * 6/1998 | Gapinski et al. | 137/223 |
| 5,819,781 | * 10/1998 | Wu | 137/231 |
| 5,975,109 | * 11/1999 | Wu | 137/231 |
| 6,105,600 | * 8/2000 | Wang | 137/231 |
| 6,105,601 | * 8/2000 | Wang | 137/231 |
| 6,164,938 | * 12/2000 | Chuang | 417/569 |

* cited by examiner

*Primary Examiner*—John Rivell
*Assistant Examiner*—Meredith Schoenfeld
(74) *Attorney, Agent, or Firm*—Browdy and Neimark

(57) ABSTRACT

An air valve connection head is compatible with a variety of air pumps and is formed of a first housing member and a second housing member. The first housing member is provided at one end thereof with an insertion hole in which the second housing member is lodged, and at other end thereof with a connection hole engageable with a cylindrical tube of the air pumps. The first housing member is further provided with a first air duct in communication with the connection hole and the insertion hole. The second housing member is provided with a receiving cell which is in turn provided at one end with a fitting port for receiving the air valve of an inflatable object. The receiving cell is provided at other end with a control handle pivoted thereto. The receiving cell is provided with an air injecting mechanism which is controlled by the control handle to lash securely and open up the air valve. The second housing member is provided in the outer periphery with a valve cell and a second air duct in communication with the valve cell and the receiving cell. The valve cell is provided with a check valve to allow one-way air flow from the first air duct to the second air duct.

6 Claims, 4 Drawing Sheets

AIR VALVE CONNECTION HEAD OF HAND-HELD AIR PUMP

FIELD OF THE INVENTION

The present invention relates generally to a hand-held air pump, and more particularly to an air valve connection head of the hand-held air pump.

BACKGROUND OF THE INVENTION

There are a variety of hand-held air pumps for bicycle. These air pumps are provided with a single air chamber, dual (multiple) air chambers, a single stroke, a dual stroke, etc. These air pumps share one thing in common in that they are all provided with a check valve to ensure the nonreturn of the air being pumped into a bicycle tire from the air pumps. The location and the structure of the check valve are various, depending on the overall design of the air pumps. For example, the U.S. Pat. No. 5,165,876 discloses an air pump comprising a piston rod 39 which is provided at the tail end thereof with a non-return valve 37 and a non-return valve cap 38. The current market situation of the bicycle air pump is chaotic in that the air valve connection heads are often independently designed and manufactured for a specific air pump, and that the air valve connection heads are therefore incompatible with the air pumps other than the specific air pump. Such a chaotic situation as described above is wasteful and uneconomical.

SUMMARY OF THE INVENTION

The primary objective of the present invention is to provide a bicycle air pump with a streamlined air valve connection head which is structurally simplified so as to be compatible with various bicycle air pumps.

In keeping with the principle of the present invention, the foregoing objective of the present invention is attained by the air valve connection head comprising a housing which is provided at one end with a receiving cell for receiving an air valve of the bicycle tire, and at other end thereof with an engagement hole for connecting the housing with the air pump cylinder. The housing is further provided in other end thereof with an air admission duct in communication with the engagement hole and the receiving cell. The receiving cell is provided with an air injecting mechanism. The housing is provided with a control handle pivoted thereto for controlling the air injecting mechanism to open up the air valve of the bicycle tire to be inflated. The present invention is characterized in that the housing is formed of a first housing member and a second housing member. The first housing member is provided at one end thereof with an insertion hole extending throughout the short axis of the first housing member. The engagement hole is extended from other end of the first housing member to the proximity of the insertion hole. A first air duct is extended from the bottom of the engagement hole to the insertion hole. The second housing member is lodged in the insertion hole. The receiving cell is located in the second housing such that an open end of the receiving cell is corresponding in location to one end of the insertion hole. The control handle is pivotally fastened with the second housing member. The second housing member is provided in the outer periphery thereof with a valve cell corresponding in location to the first air duct. A second air duct is extended from the bottom of the valve cell to the wall of the receiving cell such that the second air duct forms with the first air duct and the valve cell the air admission duct. The valve cell is provided with a check valve allowing air to flow in a one-way manner from the first air duct to the second air duct.

DETAILED DESCRIPTION OF THE INVENTION

As shown in FIGS. 1–4, an air valve connection head 8 of the first preferred embodiment of the present invention comprises the component parts which are described hereinafter.

Figure 1:
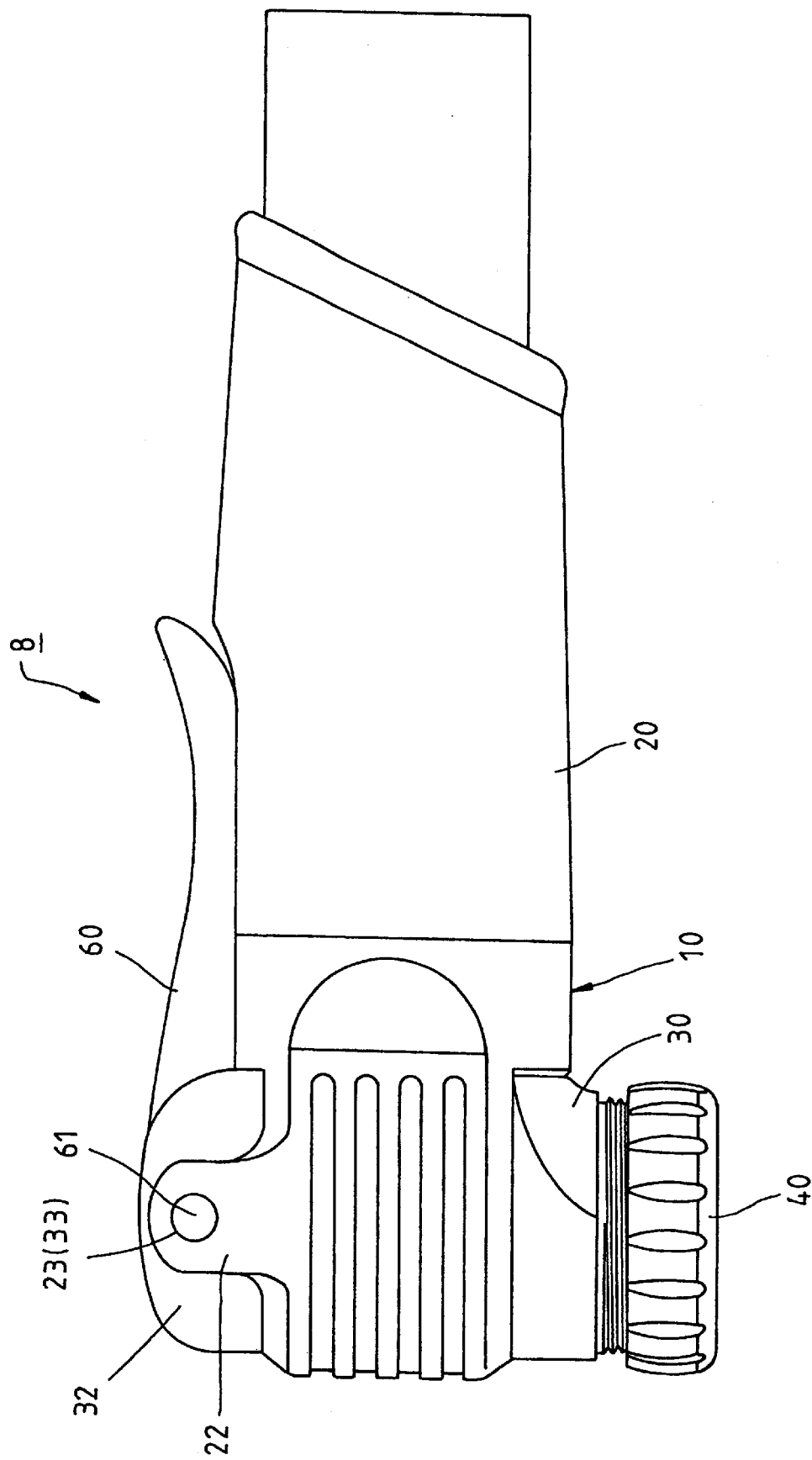
FIG. 1 shows a side view of a first preferred embodiment of the present invention.
Figure 2:
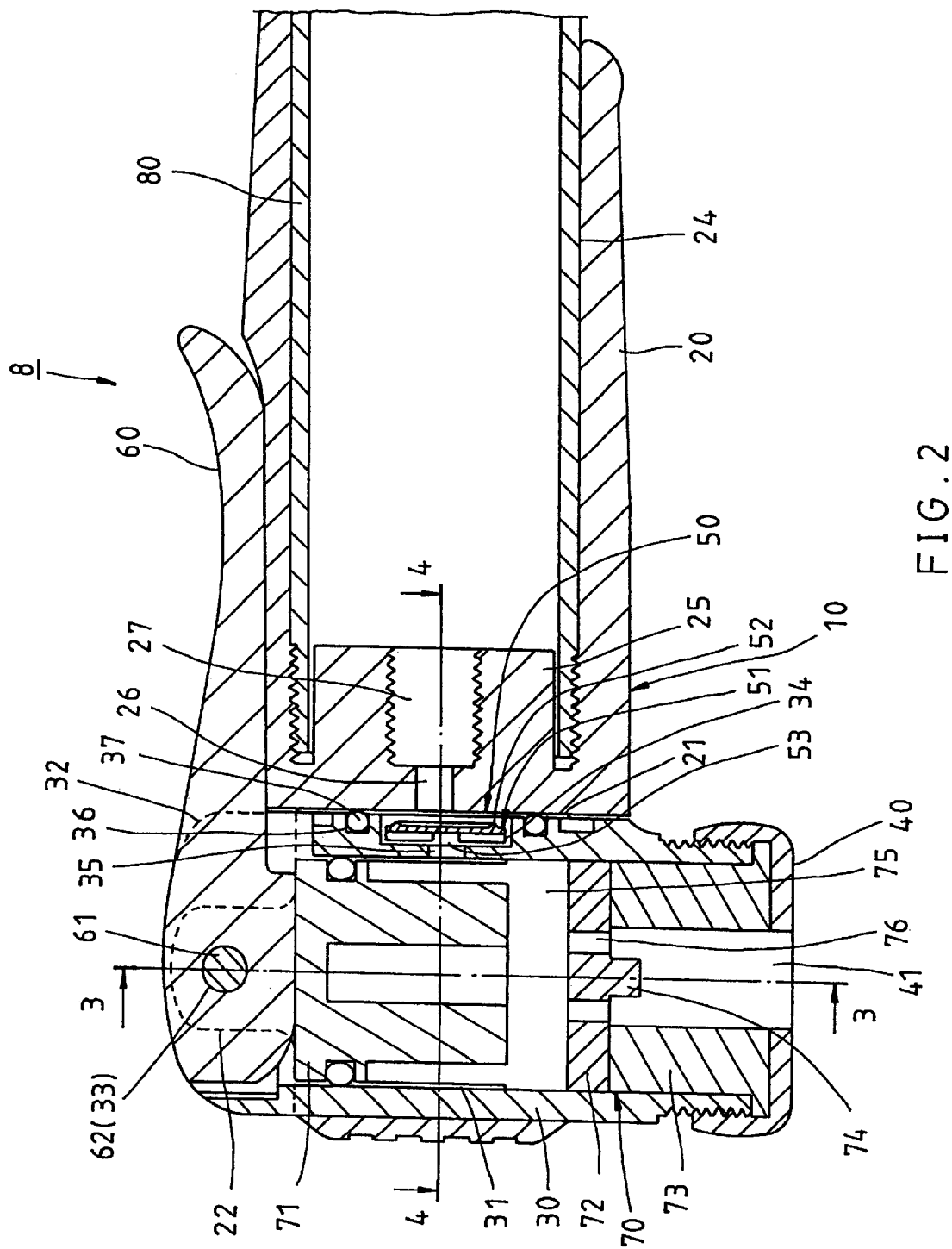
FIG. 2 shows a side sectional view of the first preferred embodiment of the present invention.
Figure 4:
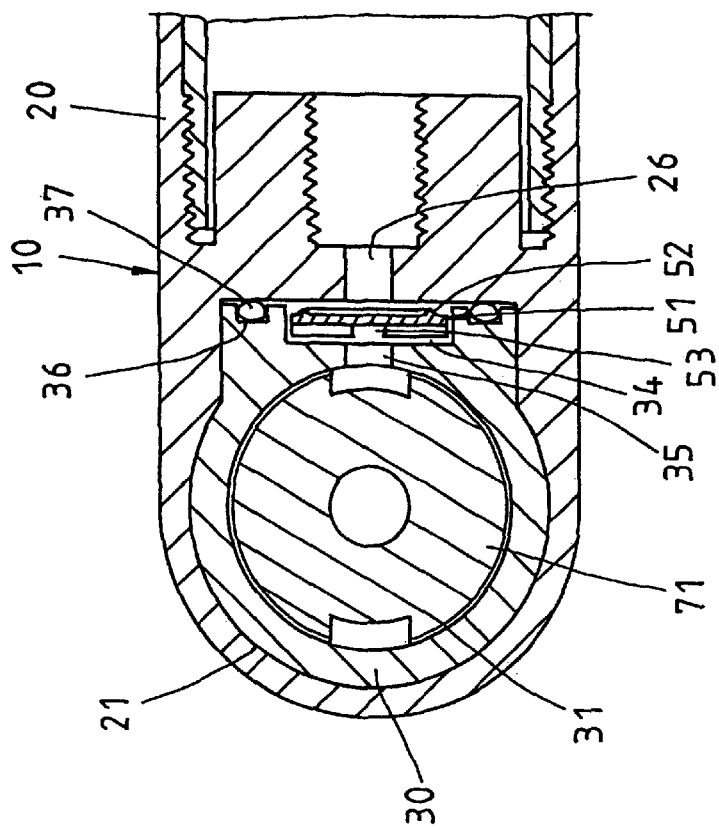
FIG. 4 shows a sectional view taken along the direction indicated by a line 4—4 as shown in FIG. 2.
Figure 3:
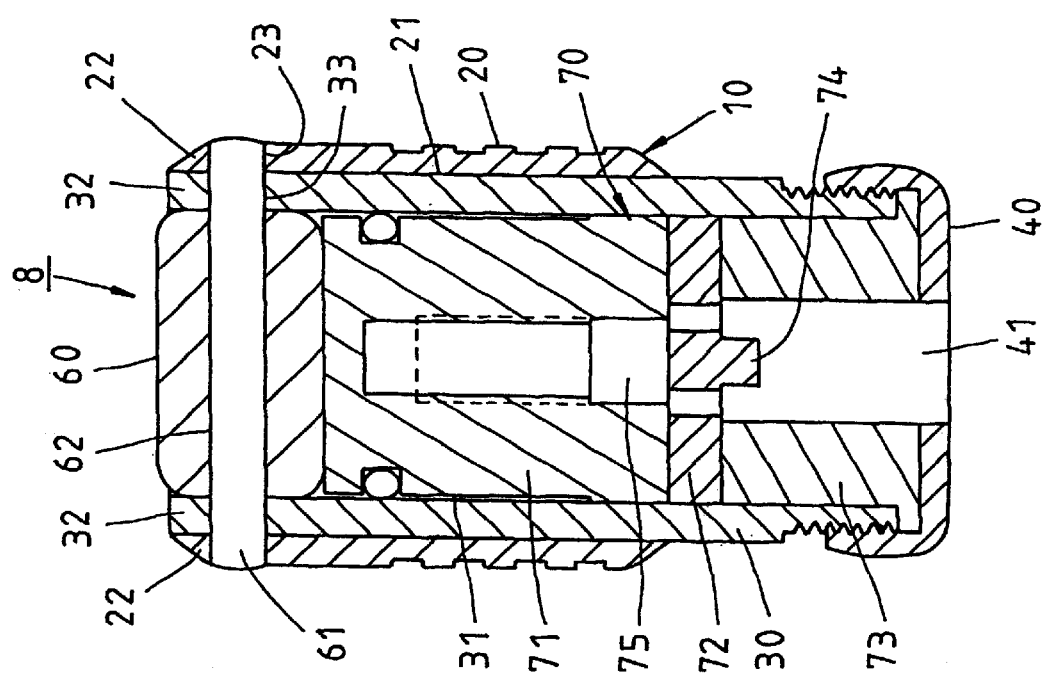
FIG. 3 shows a sectional view taken along the direction indicated by a line 3—3 as shown in FIG. 2.

A housing 10 is formed of a first housing member 20 and a second housing member 30. The first housing member 20 is provided in one end with an insertion hole 21 extending throughout the short axis of the first housing member 20. The insertion hole 21 has a cross section having an outer circular profile and an inner square profile, as shown in FIG. 4. The insertion hole 21 is provided at one end with two clamp walls 22 opposite to each other. The two clamp walls 22 are provided with a pinhole 23. The first housing member 20 is provided at other end with a cylindrical connection hole 24 extending to the proximity of the insertion hole 21. The connection hole 24 is provided in the bottom with a cylindrical seat block 25, and a first air duct 26 of a fisheye shape and extending from the seat block 25 to the wall of the insertion hole 21. The second housing member 30 has a cross-sectional profile enabling the second housing member 30 to be lodged in the insertion hole 21. The second housing member 30 is provided with two cylindrical receiving cells 31 and two side walls 32 opposite to each other and having a pin hole 33. The second housing member 30 is provided in the outer periphery thereof with a round valve cell 34, a second air hole 35 extending from the bottom of the valve cell 34 to the receiving cell 31. A leakproof ring 37 is disposed in the annular slot 36 to prevent the air leak from the gap between the two housing members 20 and 30. The air leak can be also averted by two leakproof rings which are disposed respectively at both ends of the second housing member 30. The second housing member 30 is further provided at other end thereof with an end cover 40 which is provided in the center with a fitting port 41.

Figure 5:
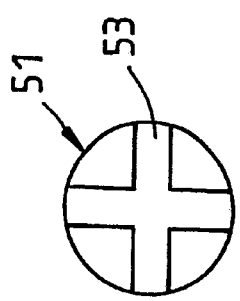
FIG. 5 shows a front view of a displacing plate of the first preferred embodiment of the present invention.

A check valve 50 is disposed in the valve cell 34 of the housing 10 and is intended to allow air to flow in a one-way manner from the first air duct 26 to the second air duct 35. The valve cell 34 is provided therein with a lightweight displacing plate 51 of a round shape and having a circular protruded strip 52 which faces the first air duct 26. The displacing plate 51 has a cruciform air guiding groove 53, as shown in FIG. 5. As the air pump is in operation such that air flows into the valve cell 34 via the first air duct 26, the displacing plate 51 is forced by the air current to move to press against the inner end of the valve cell 34. In the meantime, air flows into the receiving cell 31 via the air guiding groove 53 and the second air duct 35. When the operation of the air pump is interrupted, the displacing plate 51 is forced by air pressure in one side of the second air duct 35 to move to press against the planar wall of the insertion hole 21 such that the circular protruded strip 53 seals off the mouth of the first air duct 26, thereby preventing air from flowing in reverse.

A control handle 60 is fastened pivotally between the two side walls 32 of the housing 10 by a pivot 61 which is received in the pin holes 23 and 33 of the two clamp walls 22 and the two side walls 32. The pivot 61 has the function of fastening the first housing 20 and the second housing 30.

An air injecting mechanism 70 is disposed in the receiving cell 31 of the housing 10 and is controlled by the control handle 60. The air injecting mechanism 70 holds and presses open the air valve of a bicycle tire so as to enable air of the air pump to be injected into the bicycle tire. The mechanism 70 is a prior art structure and is therefore not the subject matter of the present invention. The receiving cell 31 contains a press member 71, a protruded urge member 72, and an elastic annular block 73, which are stacked together. The press member 71 is pressed directly by the control handle 60 to bring about the deformation of the elastic annular block 73, thereby resulting in the deformed block 73 to lash securely the air valve which is received in the fitting port 41. In the meantime, the urge needle 74 of the protruded urge member 72 urges the valve bar of the air valve, so as to enable the air in the receiving cell 31 to flow into the air valve via the through hole 75 of the press member 71 and the guide hole 76 of the protruded urge member 72.

The air valve connection head of the present invention described above is compatible with a variety of air pumps such that the cylindrical tube 80 of the air pumps is fastened in the connection hole 24 of the housing 10. If the air pump is provided with a tubular piston rod, the piston rod is fastened with the large diametrical end 27 of the first air duct 26.

The present invention is structurally simplified to be devoid of the check valve. As a result, there is no need to design a structure to accommodate the check valve portion of a new product. The production cost of the new product is thus reduced.

The first housing member and the second housing member may be made of a plastic material by injection molding such that they are different in color to give an added esthetic effect to the air valve connection head of the present invention.

Figure 7:
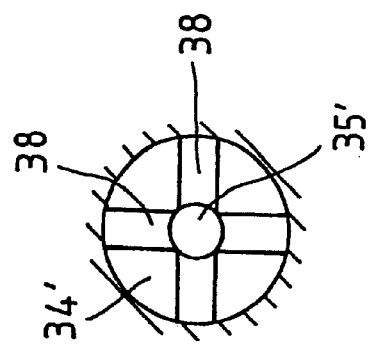
FIG. 7 shows a sectional view taken along the direction indicated by a line 7—7 as shown in FIG. 6.
Figure 6:
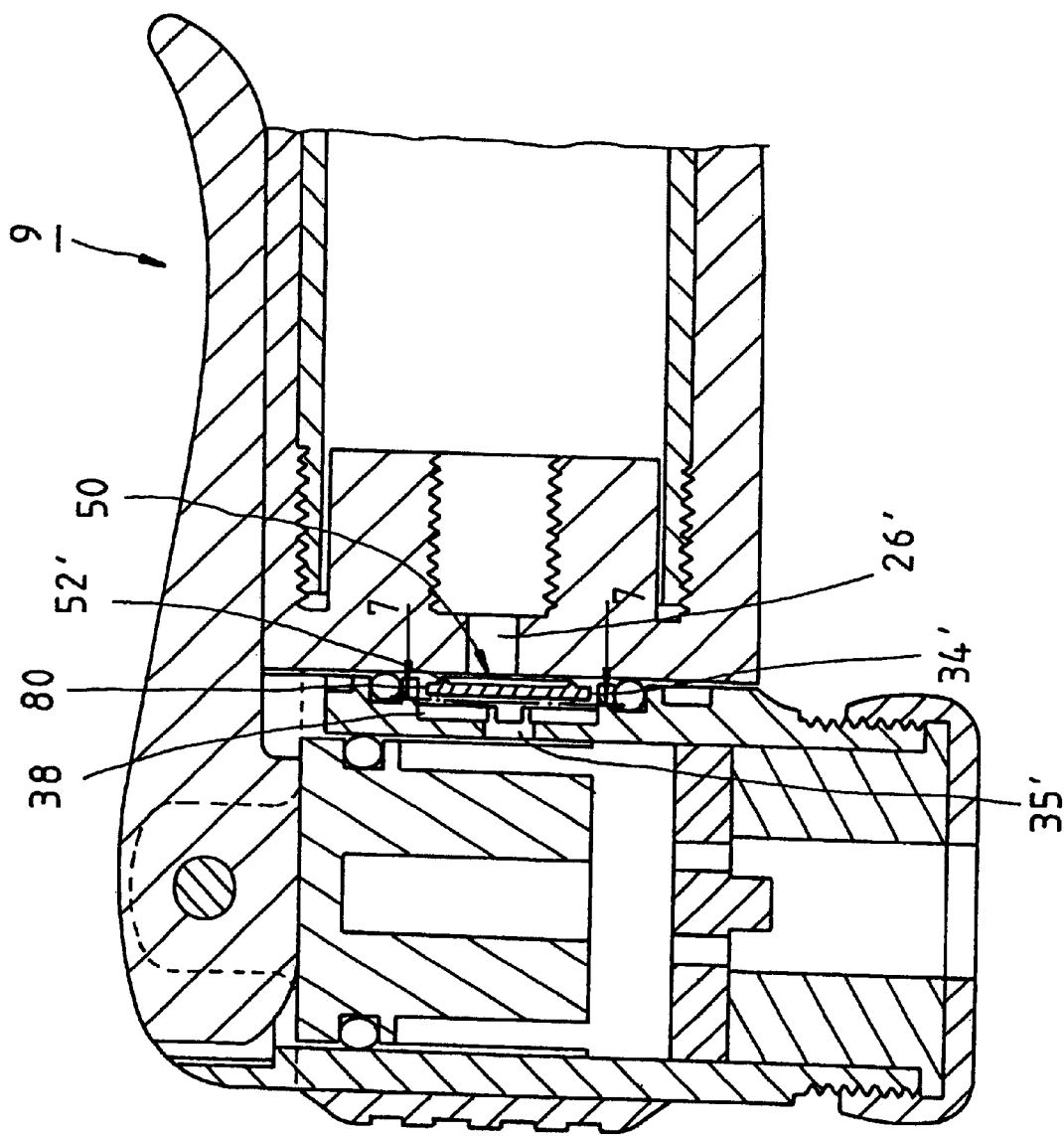
FIG. 6 shows a side sectional view of a second preferred embodiment of the present invention.

As shown in FIG. 6, an air valve connection head 9 of the second preferred embodiment of the present invention is basically similar in construction to the air valve connection head 8 described above, with the exception of a check valve 50' of the air valve connection head 9. The valve cell 34' is provided in the bottom with a plurality of ribs 38, as shown in FIG. 7. The valve cell 34' is provided therein with a displacing plate 80 which can be pushed by the air current to displace and is provided with a circular protruded strip 52' facing the first air duct 26' and capable of obstructing the opening. When the displacing plate 80 presses against the bottom of the valve cell 34', the air flows into the second air duct 35' via the gap between the ribs 38.

What is claimed is:

1. An air valve connection head of a hand-held air pump, said air valve connection head comprising a housing which is provided in one end with a receiving cell for receiving an air valve of the inflatable object, said housing provided in other end with a connection hole for connecting said housing to a cylindrical tube of the hand-held air pump, said housing further provided with an air admission duct in communication with said connection hole and said receiving cell, said receiving cell provided therein with an air injecting mechanism, said housing further provided with a control handle pivoted thereto for causing said air injecting mechanism to lash securely and open up the air valve; wherein said housing is formed of a first housing member and a second housing member, said first housing member provided at one end thereof with an insertion hole extending throughout a short axis of said first housing member, said first housing member provided at other end with said connection hole extending to the proximity of said insertion hole, and a first air duct extending from the bottom of said connection hole to said insertion hole, into said insertion hole said second housing member is lodged, said second housing member provided with said receiving cell with an open end corresponding to one end of said insertion hole, said receiving cell having a fitting port located at other end thereof, said control handle being pivoted to said housing such that said control handle is corresponding in location to said open end of said receiving cell, said second housing member being provided in an outer periphery thereof with a valve cell corresponding in location to said first air duct, a second air duct extending from the bottom of said valve cell to said receiving cell to form said air admission duct along with said first air duct and said valve cell, said valve cell of said second housing member being provided therein with a check valve for allowing air to flow in a one-way manner from said first air duct to said second air duct, wherein said insertion hole of said first housing member is provided in the wall with a planar surface located at one end of said first air duct; wherein said valve cell is provided with a displacing plate capable of being forced by air current to displace, said displacing plate provided with a circular protruded strip facing said first air duct, and an air guiding groove whereby said displacing plate presses against said wall of said insertion hole such that said first air duct is sealed off by said circular protruded strip, air in said valve cell flowing into said second air duct via said air guiding groove at such time when said displacing plate presses against the bottom of said valve cell.

2. The air valve connection head as defined in claim 1, wherein said second housing member is provided at said open end of said receiving cell thereof with two side walls opposite to each other, with each of said two walls having a pin hole; wherein said first housing member is provided with two clamp walls clamping said two side walls, said two clamp walls provided with a pin hole; wherein said control handle is provided at one end thereof with an axial hole and is fastened pivotally to said housing by a pivot which is received in said pin holes of said side walls and said clamp walls, and said axial hole of said control handle.

3. An air valve connection head of a hand-held air pump, said air valve connection head comprising a housing which is provided in one end with a receiving cell for receiving an air valve of the inflatable object, said housing provided in other end with a connection hole for connecting said housing to a cylindrical tube of the hand-held air pump, said housing further provided with an air admission duct in communication with said connection hole and said receiving cell, said receiving cell provided therein with an air injecting mechanism, said housing further provided with a control handle pivoted thereto for causing said air injecting mechanism to lash securely and open up the air valve; wherein said housing is formed of a first housing member and a second housing member, said first housing member provided at one end thereof with an insertion hole extending throughout a short axis of said first housing member, said first housing member provided at other end with said connection hole extending to the proximity of said insertion hole, and a first air duct extending from the bottom of said connection hole to said insertion hole, into said insertion hole said second housing member is lodged, said second housing member provided with said receiving cell with an open end corresponding to one end of said insertion hole, said receiving cell having a fitting port located at other end thereof, said control handle being pivoted to said housing such that said control handle is corresponding in location to said open end of said receiving cell, said second housing member being provided in an outer periphery thereof with a valve cell corresponding in location to said first air duct, a second air duct extending from the bottom of said valve cell to said receiving cell to form said air admission duct along with said first air duct and said valve cell, said valve cell of said second housing member being provided therein with a check valve for allowing air to flow in a one-way manner from said first air duct to said second air duct, wherein said insertion hole of said first housing member is provided a planar wall surface corresponding in location to one end of said first air duct; wherein said valve cell is provided in the bottom with a plurality of ribs, said valve cell provided with a displacing place displaceable by air current, said displacing plate provided with a circular protruded strip facing said first air duct whereby said displacing plate presses against the wall of said insertion hole such that said circular protruded strip seals off said first air duct, air in said valve cell flowing into said second air duct via the gap between said ribs at such time when said displacing plate presses against the bottom of said valve cell.

4. The air valve connection head as defined in claim 3, wherein said second housing member is provided at said open end of said receiving cell thereof with two side walls opposite to each other, with each of said two walls having a pin hole; wherein said first housing member is provided with two clamp walls clamping said two side walls, said two clamp walls provided with a pin hole; wherein said control handle is provided at one end thereof with an axial hole and is fastened pivotally to said housing by a pivot which is received in said pin holes of said side walls and said clamp walls, and said axial hole of said control handle.

5. An air valve connection head of a hand-held air pump, said air valve connection head comprising a housing which is provided in one end with a receiving cell for receiving an air valve of the inflatable object, said housing provided in other end with a connection hole for connecting said housing to a cylindrical tube of the hand-held air pump, said housing further provided with an air admission duct in communication with said connection hole and said receiving cell, said receiving cell provided therein with an air injecting mechanism, said housing further provided with a control handle pivoted thereto for causing said air injecting mechanism to lash securely and open up the air valve; wherein said housing is formed of a first housing member and a second housing member, said first housing member provided at one end thereof with an insertion hole extending throughout a short axis of said first housing member, said first housing member provided at other end with said connection hole extending to the proximity of said insertion hole, and a first air duct extending from the bottom of said connection hole to said insertion hole, into said insertion hole said second housing member is lodged, said second housing member provided with said receiving cell with an open end corresponding to one end of said insertion hole, said receiving cell having a fitting port located at other end thereof, said control handle being pivoted to said housing such that said control handle is corresponding in location to said open end of said receiving cell, said second housing member being provided in an outer periphery thereof with a valve cell corresponding in location to said first air duct, a second air duct extending from the bottom of said valve cell to said receiving cell to form said air admission duct along with said first air duct and said valve cell, said valve cell of said second housing member being provided therein with a check valve for allowing air to flow in a one-way manner from said first air duct to said second air duct, wherein said second housing member is provided in a periphery thereof with a circular slot circumventing said valve cell and having a leakproof ring which presses against the wall of said insertion hole.

6. The air valve connection head as defined in claim 5, wherein said second housing member is provided at said open end of said receiving cell thereof with two side walls opposite to each other, with each of said two walls having a pin hole; wherein said first housing member is provided with two clamp walls clamping said two side walls, said two clamp walls provided with a pin hole; wherein said control handle is provided at one end thereof with an axial hole and is fastened pivotally to said housing by a pivot which is received in said pin holes of said side walls and said clamp walls, and said axial hole of said control handle.

\* \* \* \* \*